United States Patent
Larson et al.

(10) Patent No.: US 6,169,876 B1
(45) Date of Patent: Jan. 2, 2001

(54) VEHICLE SEAT MOUNTED EDUCATIONAL BOOK

(76) Inventors: John Larson; Sherry Larson, both of 16127 Inverness Way, Lakeville, MN (US) 55044

( * ) Notice: Under 35 U.S.C. 154(b), the term of this patent shall be extended for 0 days.

(21) Appl. No.: 09/213,130

(22) Filed: Dec. 17, 1998

(51) Int. Cl.⁷ .................................................. G09B 5/00
(52) U.S. Cl. .............................. 434/309; 281/43; 281/45
(58) Field of Search .................................. 434/317, 309; 446/148, 227, 488, 147; 211/42; 248/692; 281/43, 44, 45, 49, 50

(56) References Cited

U.S. PATENT DOCUMENTS

| | | | |
|---|---|---|---|
| 1,344,498 | * 6/1920 | Fox | 281/45 |
| 1,419,190 | * 6/1922 | Zipoy | 281/45 |
| 2,012,545 | * 8/1935 | Pickering et al. . | |
| 2,527,216 | * 10/1950 | Harris | 281/45 |
| 2,552,704 | * 5/1951 | Armstrong et al. . | |
| 2,706,517 | * 4/1955 | Dexter et al. | 211/42 |
| 3,919,795 | * 11/1975 | Van Horne Jinivisian | 40/33 |
| 3,986,649 | * 10/1976 | Heimstra | 211/42 |
| 4,662,855 | * 5/1987 | Morrison | 446/227 |
| 4,711,419 | * 12/1987 | Polosky . | |
| 4,898,406 | * 2/1990 | Willius | 281/43 |
| 4,931,017 | * 6/1990 | Mann | 434/87 |
| 4,998,694 | * 3/1991 | Barteaux . | |
| 5,167,508 | * 12/1992 | Mc Taggart | 434/317 |
| 5,195,918 | * 3/1993 | Mozes | 446/227 |
| 5,253,943 | * 10/1993 | Miyashita | 402/68 |
| 5,456,369 | * 10/1995 | Smed . | |
| 5,575,659 | * 11/1996 | King et al. | 434/467 |
| 5,588,543 | * 12/1996 | Finger | 211/42 |
| 5,707,240 | * 1/1998 | Haas et al. | 434/317 |
| 5,709,582 | * 1/1998 | O'Donnell | 446/227 |
| 5,785,222 | * 7/1998 | Basso et al. . | |

* cited by examiner

*Primary Examiner*—Jacob K. Ackun
*Assistant Examiner*—Bena B. Miller

(57) ABSTRACT

A child educating system is provided including a book and at least one hook coupled to the book and adapted for being attached to a recipient surface in a vehicle. By this structure, the book may be supported on the recipient surface.

1 Claim, 2 Drawing Sheets

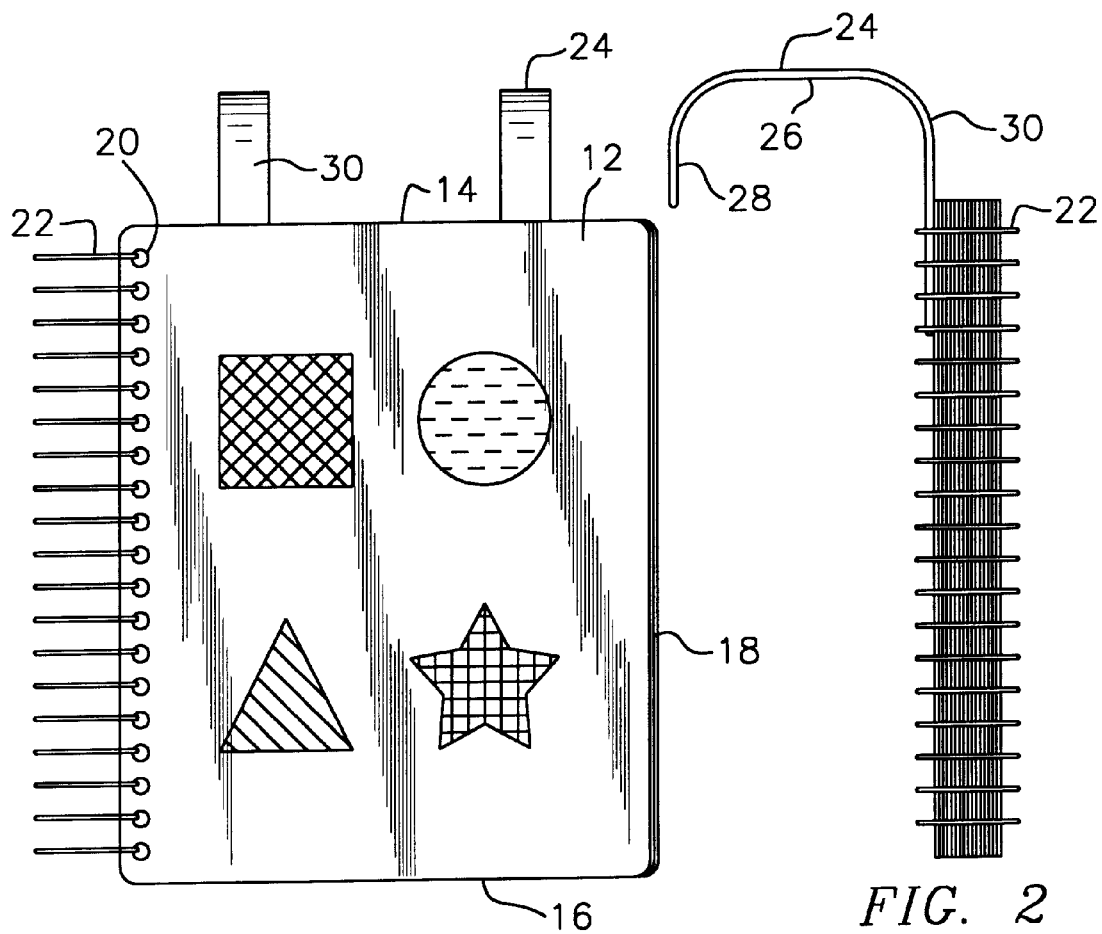
FIG. 1
FIG. 2
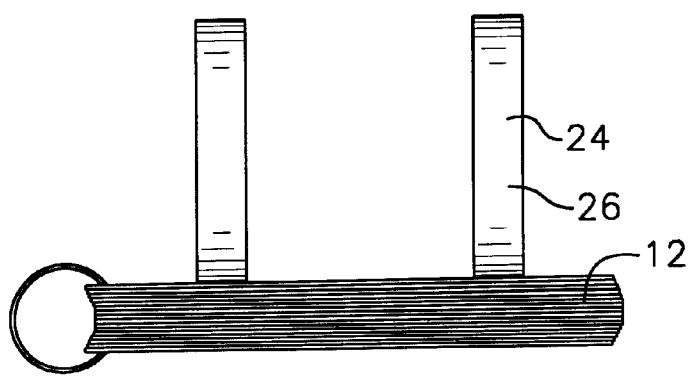
FIG. 3

VEHICLE SEAT MOUNTED EDUCATIONAL BOOK

BACKGROUND OF THE INVENTION

1. Field of the Invention

The present invention relates to education devices and more particularly pertains to a new vehicle seat mounted educational book for educating or entertaining a child within a vehicle.

2. Description of the Prior Art

The use of education devices is known in the prior art. More specifically, education devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,661,072; 5,188,421; 4,321,768; 4,540,219; 2,078,022; and U.S. Pat. Des. 333,321.

In these respects, the vehicle seat mounted educational book according to the present invention substantially departs from the conventional concepts and designs of the prior art, and in so doing provides an apparatus primarily developed for the purpose of educating or entertaining a child within a vehicle.

SUMMARY OF THE INVENTION

In view of the foregoing disadvantages inherent in the known types of education devices now present in the prior art, the present invention provides a new vehicle seat mounted educational book construction wherein the same can be utilized for educating or entertaining a child within a vehicle.

The general purpose of the present invention, which will be described subsequently in greater detail, is to provide a new vehicle seat mounted educational book apparatus and method which has many of the advantages of the education devices mentioned heretofore and many novel features that result in a new vehicle seat mounted educational book which is not anticipated, rendered obvious, suggested, or even implied by any of the prior art education devices, either alone or in any combination thereof.

To attain this, the present invention generally comprises a plurality of pages each constructed from a flexible resilient material. As shown in the Figures, each page has a substantially planar rectangular configuration with a periphery defined by a short top edge, a short bottom edge, and a pair of elongated side edges. One of the elongated side edges has a plurality of linearly aligned bores formed therein along a length thereof. Next provided is a spiral binder including a wire formed in a spiral configuration. The spiral binder is adapted for being positioned within the bores of the pages to allow the same to be opened and closed with respect to each other. As such, a book is defined. Also included is a pair of hooks each constructed from a flexible resilient plastic material. Each hook has a uniform planar rectangular cross-section along a length thereof. Further, each hook includes a substantially planar rectangular horizontal extent and a substantially planar rectangular first vertical extent coupled to a first end of the horizontal extent and extending downwardly therefrom in perpendicular relationship therewith. Associated therewith is a substantially planar rectangular second vertical extent integrally coupled to a second end of the horizontal extent and extending downwardly therefrom in perpendicular relationship therewith. The second vertical extent has a length about twice that of the first vertical extent. As shown in FIGS. 2 & 3, the second vertical extent of each hook is coupled to a surface of a common one of the pages. The second vertical extent extends upwardly from the top edge in perpendicular relationship with the top edge. As such, the first vertical extent remains in parallel relationship with the second horizontal extent. Further, an end of the first vertical extent remains level with the top edge of the page to which the hooks are coupled. In the preferred embodiment, the hooks are each mounted to the associated page between one of the side edges thereof and a midpoint thereof. By this interconnection, the hooks are spaced about ½ a width of the page.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle seat mounted educational book apparatus and method which has many of the advantages of the education devices mentioned heretofore and many novel features that result in a new vehicle seat mounted educational book which is not anticipated, rendered obvious, suggested, or even implied by any of the prior art education devices, either alone or in any combination thereof.

It is another object of the present invention to provide a new vehicle seat mounted educational book which may be easily and efficiently manufactured and marketed.

It is a further object of the present invention to provide a new vehicle seat mounted educational book which is of a durable and reliable construction.

An even further object of the present invention is to provide a new vehicle seat mounted educational book which is susceptible of a low cost of manufacture with regard to both materials and labor, and which accordingly is then susceptible of low prices of sale to the consuming public, thereby making such vehicle seat mounted educational book economically available to the buying public.

Still yet another object of the present invention is to provide a new vehicle seat mounted educational book which provides in the apparatuses and methods of the prior art some of the advantages thereof, while simultaneously overcoming some of the disadvantages normally associated therewith.

Still another object of the present invention is to provide a new vehicle seat mounted educational book for educating or entertaining a child within a vehicle.

Even still another object of the present invention is to provide a new vehicle seat mounted educational book that includes a book and at least one hook coupled to the book and adapted for being attached to a recipient surface in a vehicle. By this structure, the book may be supported on the recipient surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front view of a new vehicle seat mounted educational book according to the present invention.

FIG. 2 is an end view of the present invention.

FIG. 3 is a top view of the present invention.

DESCRIPTION OF THE PREFERRED EMBODIMENT

Figure 4:
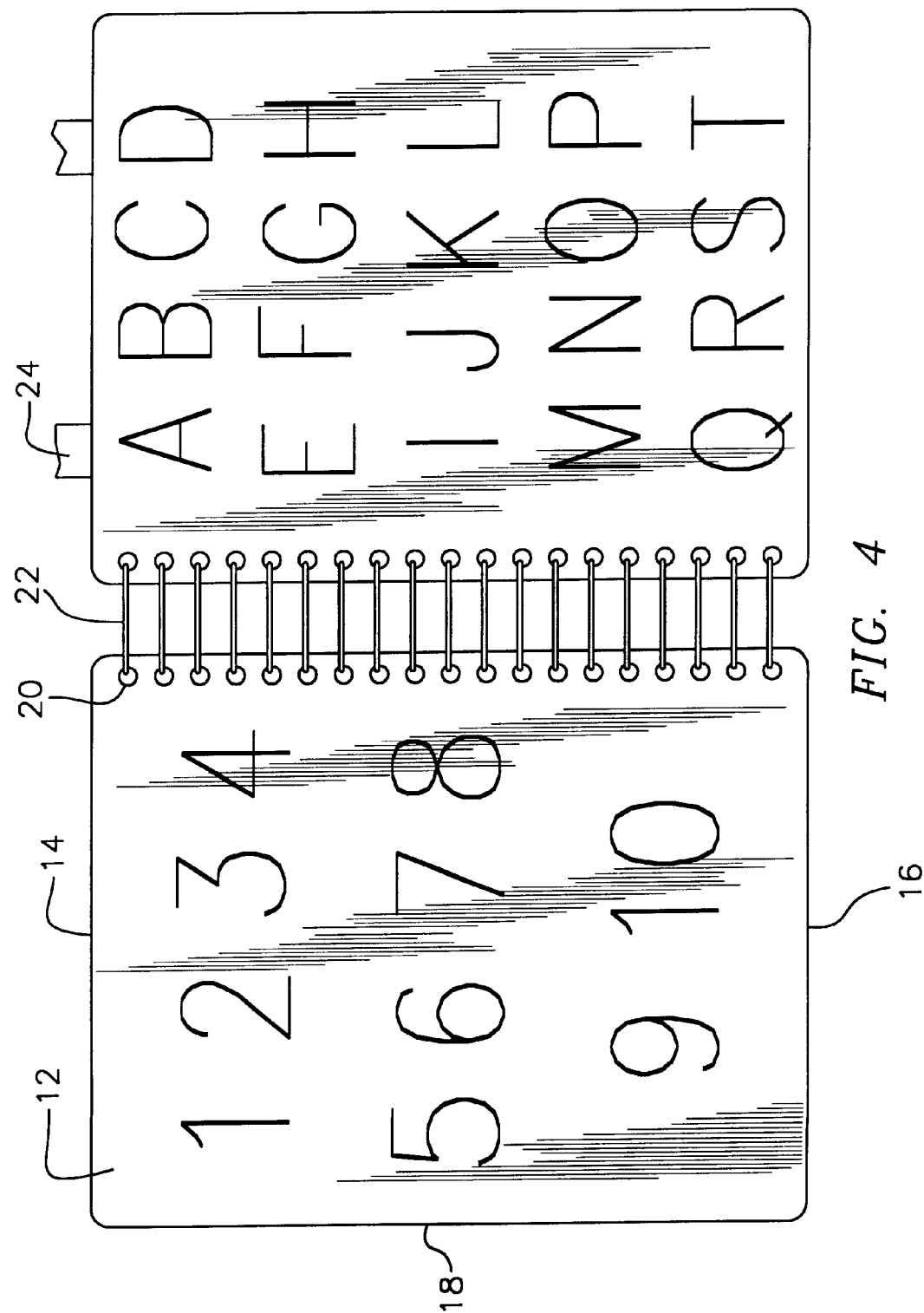
FIG. 4 is a side view of the present invention with the book in an open orientation.

With reference now to the drawings, and in particular to FIGS. 1 through 4 thereof, a new vehicle seat mounted educational book embodying the principles and concepts of the present invention and generally designated by the reference numeral 10 will be described.

The present invention, designated as numeral 10, includes a plurality of pages 12 each constructed from a flexible resilient material. As shown in the Figures, each page has a substantially planar rectangular configuration with a periphery defined by a short top edge 14, a short bottom edge 16, and a pair of elongated side edges 18. One of the elongated side edges has a plurality of linearly aligned bores 20 formed therein along a length thereof. As shown in FIGS. 1 & 4, each of the pages of the book has numbers, alphabetic characters, or shapes thereon. Ideally, each of the foregoing characters comprises a push button momentary switch which is connected to an audio device positioned therebehind for the purpose of identifying the associated character. For example, when the number "3" is depressed, the audio device will audibly recite "3".

Next provided is a spiral binder 22 including a wire formed in a spiral configuration. The spiral binder is adapted for being positioned within the bores of the pages to allow the same to be opened and closed with respect to each other. As such, a book is defined.

Also included is a pair of hooks 24 each constructed from a flexible resilient plastic material. Each hook has a uniform planar rectangular cross-section along a length thereof. Further, each hook includes a substantially planar rectangular horizontal extent 26 and a substantially planar rectangular first vertical extent 28 coupled to a first end of the horizontal extent and extending downwardly therefrom in perpendicular relationship therewith. Associated therewith is a substantially planar rectangular second vertical extent 30 integrally coupled to a second end of the horizontal extent and extending downwardly therefrom in perpendicular relationship therewith. The second vertical extent has a length about twice that of the first vertical extent. Ideally, interconnections between the vertical and horizontal extents of the hooks are arcuate.

As shown in FIGS. 2 & 3, the second vertical extent of each hook is coupled to a surface of a common one of the pages. The second vertical extent extends upwardly from the top edge of the associated page in perpendicular relationship with the top edge. As such, the first vertical extent remains in parallel relationship with the second horizontal extent. Further, an end of the first vertical extent remains level with the top edge of the page to which the hooks are coupled. In the preferred embodiment, the hooks are each mounted to the associated page midway between one of the side edges and a midpoint thereof. By this interconnection, the hooks are spaced about ½ a width of the page. By this structure, the hooks of the present invention may be positioned over a seat of a vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A vehicular child educating system comprising:
    a plurality of pages each constructed from a flexible resilient material and each having a substantially planar rectangular configuration with a periphery defined by a short top edge, a short bottom edge, and a pair of elongated side edges, one of the elongated side edges having a plurality of linearly aligned bores formed therein along a length thereof, said bores being adjacent to one of said side edges;
    a spiral binder including a wire formed in a spiral configuration and passing through the bores of all of the pages to allow the pages to be opened and closed with respect to each other, thereby defining a book;

a pair of hooks each constructed from a flexible resilient plastic material and having a uniform planar rectangular cross-section along a length thereof, each hook including a substantially planar rectangular horizontal extent, a substantially planar rectangular first vertical extent being coupled to a first end of the horizontal extent and extending downwardly therefrom in perpendicular relationship therewith, and a substantially planar rectangular second vertical extent integrally coupled to a second end of the horizontal extent and extending downwardly therefrom in perpendicular relationship therewith, wherein the second vertical extent has a length about twice that of the first vertical extent;

said second vertical extent of each hook being coupled to a surface of a back one of the pages, both of the hooks being coupled to the same page so that the book may be suspended in an open orientation with pages positioned on both sides of the spiral binder and in a closed orientation with all of the pages positioned on one side of the spiral binder, each hook extending upwardly from the top edge of the back page in perpendicular relationship with the top edge such that the first vertical extent remains in parallel relationship with the second vertical extent and an end of the first vertical extent remains level with the top edge of the page to which the hooks are coupled, wherein the hooks are each mounted to the back page between one of the side edges and a midpoint of the back page such that the hooks are spaced from each other about one-half a width of the back page.

\* \* \* \* \*